United States Patent
Vallieres et al.

(10) Patent No.: US 6,366,536 B1
(45) Date of Patent: Apr. 2, 2002

(54) HIGH-RESOLUTION SEISMIC ACQUISITION DEVICE

(75) Inventors: Thierry Des Vallieres, Boulogne; Jacques Meunier, Brest; Gilles Grosso, Six-Fours Plage, all of (FR)

(73) Assignees: Total Fina Elf S.A., Bourbevoie; Etudes et Recherches Realisations Mecaniques et Electroniques (Eramer), La Seyne sur Mer; Institut Francais de Recherche pour l'Exploitation de la Mer(Ifremer), Issy les Moulineaux, all of (FR)

( * ) Notice: Subject to any disclaimer, the term of this patent is extended or adjusted under 35 U.S.C. 154(b) by 0 days.

(21) Appl. No.: 09/701,914
(22) PCT Filed: Jun. 9, 1999
(86) PCT No.: PCT/FR99/01365
§ 371 Date: Mar. 19, 2001
§ 102(e) Date: Mar. 19, 2001
(87) PCT Pub. No.: WO99/64897
PCT Pub. Date: Dec. 16, 1999

(30) Foreign Application Priority Data

Jun. 9, 1998 (FR) .............................. 98 07226

(51) Int. Cl.$^7$ ................................................ G01V 1/38
(52) U.S. Cl. ........................................................ 367/154
(58) Field of Search ................................ 367/141, 154, 367/162; 181/110

(56) References Cited

U.S. PATENT DOCUMENTS

| | | | |
|---|---|---|---|
| 5,357,481 A | 10/1994 | Lester et al. | 367/31 |
| 5,363,345 A | 11/1994 | Bouher et al. | 367/162 |

FOREIGN PATENT DOCUMENTS

| | | | |
|---|---|---|---|
| DE | 1 046 903 | | 12/1958 |
| EP | 209 238 A2 | | 6/1986 |
| FR | 1.397.142 | | 7/1963 |
| GB | 2357843 A | * | 7/2001 |

OTHER PUBLICATIONS

Joseph F. Gettrust, et al. "Development of a Low-Frequency, Deep-Towed Geoacoustics System", pp. 38–40, (1990).

* cited by examiner

Primary Examiner—Daniel T. Pihulic
(74) Attorney, Agent, or Firm—Scully, Scott, Murphy & Presser

(57) ABSTRACT

The invention relates to a seismic acquisition device in a marine environment. The device comprises a Janus Helmholtz (12) transducer which is able to operate at a large depth of immersion and to sound waves in a wide frequency band, a calculator (13) to program at will the frequency band and the form of the sound waves emitted by the transducer, a power amplifier (14) that can control the transducer in order to provide the emitted sound waves with predetermined power levels, an impedance adapter (16) placed between the transducer (12) and the amplifier to enable wide band and power adaptation, and a receiver (18) to capture the seismic waves reflected by the different layers of the sea bed.

3 Claims, 2 Drawing Sheets

HIGH-RESOLUTION SEISMIC ACQUISITION DEVICE

FIELD OF THE INVENTION

The present invention relates to a seismic acquisition device for charting marine floors by seismic reflection, with a very high resolution and up to floor depths of as much as a hundred meters.

BACKGROUND OF THE INVENTION

At present, in order to chart marine floors, use is made of a diverse range of seismic sources which generate acoustic waves. Each source is characterized by the frequency band or spectrum of the acoustic emission. With each spectrum there corresponds a depth of penetration of the wave into the floor and a specific resolution.

Two types of sources are commonly used: on the one hand, sediment penetrators or pingers which are sources operating with a transducer and on the other hand, boomers which generate acoustic waves using Foucault currents in two parallel metal plates. An exemplary sediment penetrator is described in patent DE 1 046 903. This source emits a spectrum which can be centered, on request, between 2 and 5 kHz and which has low penetration (between 0 and 10 m) but high resolution. For its part, the Foucault current acoustic wave generator emits a spectrum which is centered on 700 Hz and which therefore has greater penetration (between 0 and 70 m), but lower resolution in the region lying between 0 and 10 m.

This is why, at present, to obtain a good knowledge of marine sediments, it is necessary to employ both these types of sources simultaneously, so as to harness their respective qualities. However, this technique is penalizing from the operational standpoint on account of the fact that it is necessary either to tow both sources simultaneously and hence to record both sources at the same time on two different recorders, thereby causing annoying interference from an electronic standpoint, or to perform two successive passes, each of the passes being carried out with just one of the two sources. Moreover, this technique is scarcely satisfactory when operating at water depths of greater than 200 m.

The article by GETTRUST J. F. et al. "Development of a low-frequency, deep-towed geoacoustic system" of Sep. 24, 1990, pages 38 to 40, describes a seismic acquisition device known as a DTAGS. This device comprises a resonator formed of five piezoelectric rings disposed around a cavity and which emits over a frequency band lying between 250 and 650 Hz.

However, the performance of such a device is rather limited on account of the narrowness of its frequency band. Moreover, its considerable weight, 800 kg, renders it difficult to tow. Finally, the so-called "deep-tow" technique, which consists in towing the transducer at great depth, above the sea bed with a multitrace acquisition system is very difficult to implement.

U.S. Pat. No. 5,363,345, which represents the closest state of the art, discloses a so-called Janus-Helmholtz transducer which can be used in a marine environment for exclusively military applications. It serves mainly to detect submerged objects, such as submarines. This transducer comprises two electro-acoustic motors disposed on either side of a central mass and whose axes are aligned along a horizontal direction, two horns being fixed to the opposite ends of the motors.

Patent FR 1 397 142 relates to a seismic source which generates vibrations electrodynamically or hydraulically, these vibrations actuating two pulsating plates. However, with this source it is not possible to chart marine floors with good resolution.

Patent EP 0 209 238 relates to a seismic source of a different kind from that of the patent application, since it comprises an electrical pulse generator and a transformer for matching.

SUMMARY OF THE INVENTION

The present invention aims to remedy these drawbacks and proposes a seismic acquisition device using a single seismic source capable of replacing the sediment penetrators and boomers, that is to say a seismic source having much greater penetration than that of sediment penetrators, allied with high resolution over the entire range of depths within which it operates.

The invention also relates to a seismic acquisition device which can be employed at great depth in sea water without its performance being impaired. It also relates to a seismic acquisition device which is, in addition, of low bulk and modest weight, is very simple to employ and particularly economical.

To obtain these results, the invention proposes a device for seismic acquisition in a marine environment according to claim 1.

Thus, for the first time in marine seismic surveying, the invention proposes that a low frequency transducer with a wide frequency band and great depth of immersion be combined with a computer, a power amplifier and an impedance matcher, with a view to obtaining a high emission level over a very wide frequency band which is programmable at will.

The use of such a transducer for marine seismic surveying is in itself an inventive idea since, as was explained earlier, this transducer was used only to detect submerged bodies, such as submarines and for this particular application, the axis of the electro-acoustic motors and of the horns was oriented horizontally. In the application to marine seismic surveying which forms the subject of the present invention, it was necessary to envisage giving the said axis other orientations, for example the vertical direction, so as to direct the power of the acoustic waves optimally. Surprisingly, hitherto nobody has thought of using this transducer for marine seismic surveying, although it makes it possible to obtain considerable advantages. Specifically, acoustic wave emissions lying between a few hundred Hz to 10,000 Hz approximately are obtained at levels of around 200 dB over a large part of this frequency band.

The acquisition device according to the invention therefore has superior performance to that of the sediment penetrator and the boomer. Moreover, it is simpler, lighter and less bulky than these two sources.

BRIEF DESCRIPTION OF THE DRAWINGS

The invention will be described below with regard to the appended drawings in which.

DETAILED DESCRIPTION OF A PREFERRED EMBODIMENT

Figure 1:
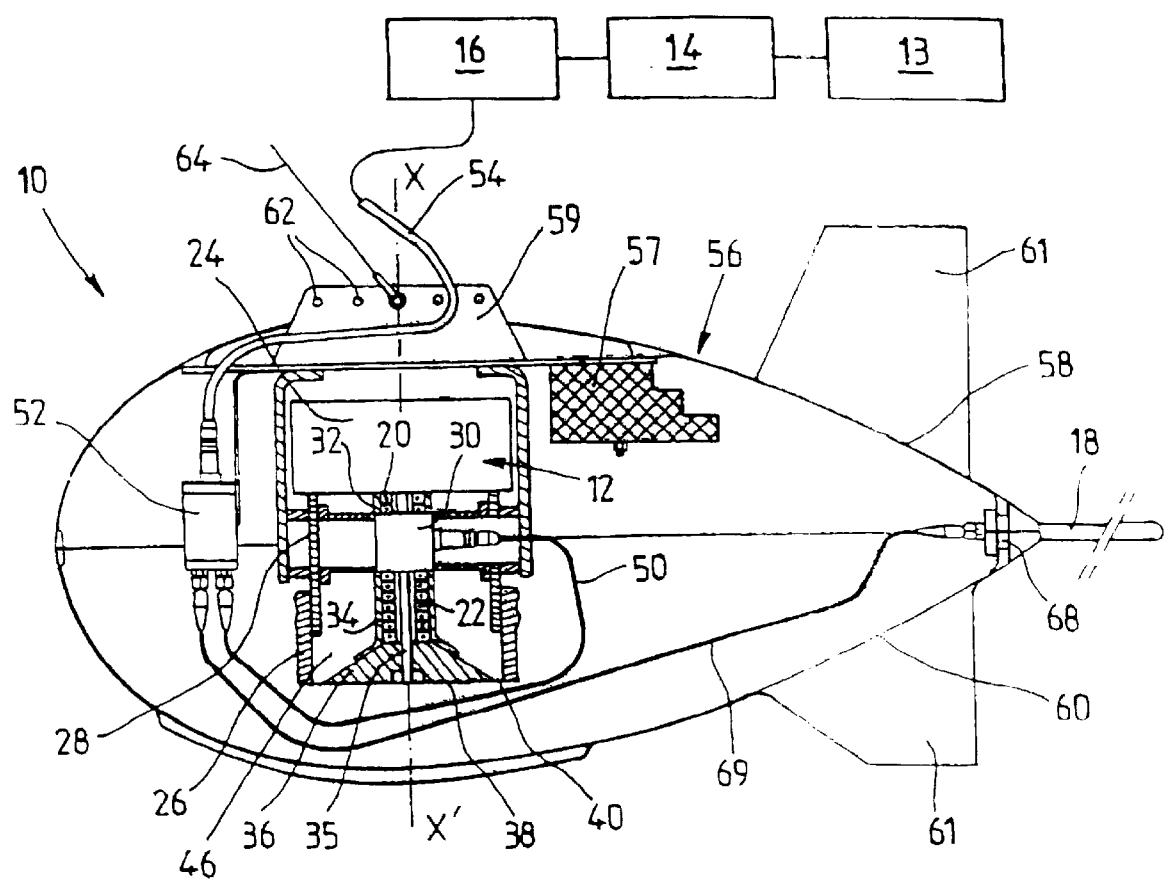
FIG. 1 is a schematic view in elevation of the seismic acquisition device according to the invention, the transducer being represented partially sectioned.
Figure 2:
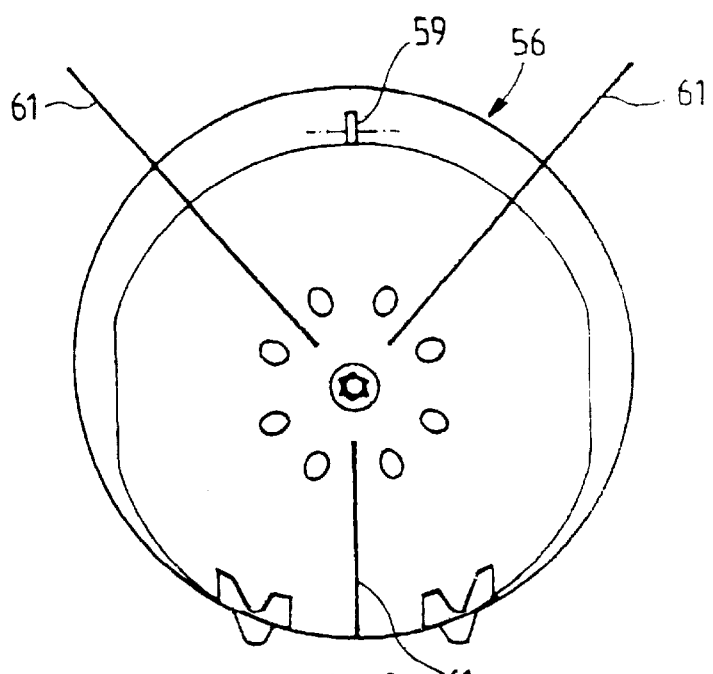
FIG. 2 is a view from the rear of the device of FIG. 1.

With reference to FIGS. 1 and 2, the seismic acquisition device 10 according to the invention comprises a transducer emitting low-frequency acoustic waves 12, in a wide band and at great immersion depth, a computer 13 intended for recording the data entered by an operator and for programming, on the basis of these data, the signal to be programmed at will the [lacuna] band frequencies and the shape of the waves emitted by the transducer [lacuna] a power amplifier 14 which drives the transducer so as to impart the desired power level to the waves emitted, an impedance matcher 16 to allow wide band and power matching and an acoustic wave receiver 18, also known as a seismic streamer.

The transducer 12 is of the Janus-Helmholtz type. In a manner known per se, this transducer comprises two electro-acoustic motors 20, 22 of tubular shape, accommodated inside a cylindrical housing which consists of two cylindrical ferrules 24, 26 connected together by two plates 28. The motors are aligned along the x–x' axis of the housing and they are disposed on either side of a central mass 30. The motors are inserted into leaktight tubular sleeves 32, 34 whose ends fit in a leaktight manner around two horns, only one of which, 36, is visible in FIG. 1. The motors are connected by a prestress rod 35 whose ends are fixed to the outer faces 38 of the horns. The said outer faces are located in the plane of the axial ends of the two ferrules 24, 26 and their extreme peripheral edge forms together with the inside wall of the ferrules a small annular gap 40.

This mode of connection allows a freedom of movement of the horns with respect to the housing and defines a partially closed fluid cavity 46 between the horns and the housing.

The motors can be made for example as two stacks of piezoelectric wafers or as magnetostrictive cylinders surrounded by an excitation coil. The motors are supplied by way of a supply cable 50 connected to a junction box 52, the latter itself being connected to the impedance matcher 16 by a cable 54.

The transducer 12 is accommodated inside a fairing 56 made up of two hollow shells 58, 60 which are joined along their peripheral edge. The fairing has a hydrodynamic shape and is furnished at the rear with a tail unit 61.

Figure 3:
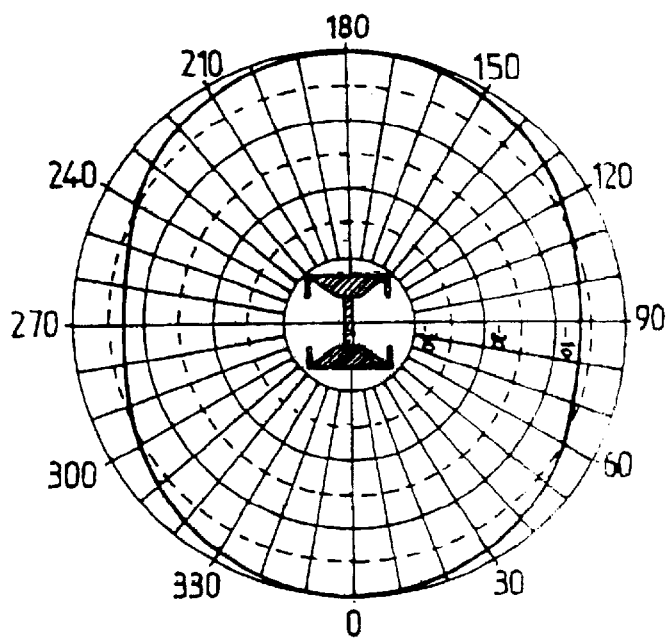
FIG. 3 represents in polar coordinates the elevational directivity pattern of the transducer according to the invention.

In the embodiment represented in FIG. 1, the transducer is positioned in such a way that its axis x–x' is oriented vertically. This orientation is chosen when one wishes to dispatch the maximum power in the vertical direction. FIG. 3 shows in polar coordinates the elevational directivity pattern of the transducer. This system of coordinates is graduated in angles of elevation (0° for the downward vertical direction) and in equipower circles. The transducer is represented schematically at the center of the coordinate system with its axis oriented vertically. The directivity curve is substantially ellipse-shaped, the major axis being vertical and the minor axis being horizontal. It is found that the acoustic waves emitted by the transducer have their maximum power in the vertical direction. It is appreciated however that in certain applications, where the maximum power is not required, the axis of the transducer may be oriented in a direction other than vertical.

The transducer is driven by the power amplifier 14. To obtain a high emission level, the amplifier must be linear of class AB or D and deliver a power lying between 3 and 9 kVa.

The impedance matcher 16 consists of a compensation inductor serving to correct the impedance of the transducer by lowering its capacitance, of a transformer which matches the corrected impedance of the transducer to the output impedance of the power amplifier and of a quenching resistor which makes it possible to reduce the excitation power and to smooth the response of the transducer.

Figure 4:
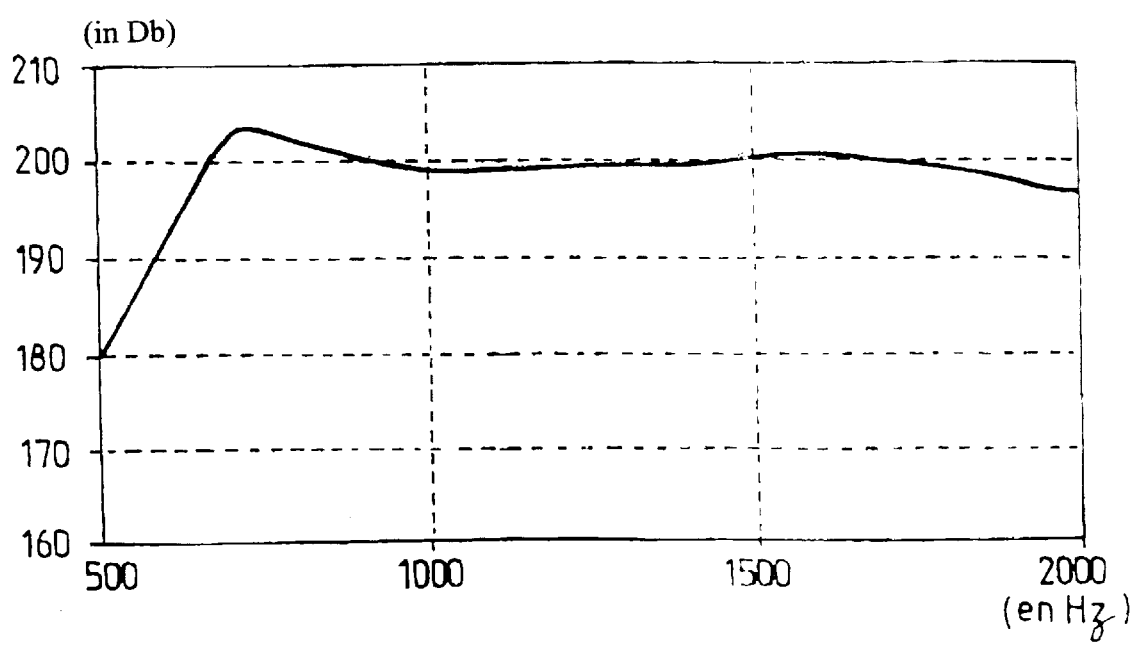
FIG. 4 is the curve of the variation of emission level as a function of the frequency of the acoustic wave emitted.

As FIG. 4 shows, a frequency spectrum is obtained which is substantially flat in the frequency range lying between 600 and 2000 Hz, with an emission level of around 200 dB. These two frequencies are the first two resonant frequencies of the transducer. Beyond 2000 Hz the response of the transducer diminishes, but this can be corrected by signal processing. The transducer can be driven at higher frequencies of up to 10,000 Hz.

The device 10 is towed, at any depth of immersion, by a ship at a normal operating speed of between 2 and 5 knots. The attitude tolerance is a few degrees so as to ensure optimal directivity. Horizontality is adjusted with a buoyancy volume 57 placed at the rear. The fairing comprises an attachment piece 59 in which are drilled anchoring points 62 for towing with a hauling cable 64 which is independent of the supply cable 54.

In a manner known per se, the seismic receiver 18 consists of a sheath containing a plurality of hydrophones mounted in series and equidistant. The receiver is towed behind the fairing, and it is linked, via a passage 68, to the junction box 52 by way of a cable 69. The seismic receiver allows the reception of signals at subvertical incidence. The length of the active span of the receiver is chosen so as to constitute a spatio-temporal filter matched to the frequency range.

In conclusion, the invention proposes a low-frequency seismic acquisition device capable of operating at large immersion depth and of emitting a signal extending over a wide frequency band which can be programmed at will by a computer. This device can sweep the frequencies lying between a few hundred Hz and 10,000 Hz approximately. Since the signal emitted is completely known, it will make it possible to perform amplitude processing operations, this being impossible to do at present with the known seismic sources. This source advantageously replaces the sediment penetrator and boomer of the prior art and therefore enables a substantial saving to be made. It operates satisfactorily at all immersion depths, including the most extreme, down to 11,000 m.

What is claimed is:

1. A device for seismic acquisition in a marine environment, of the type comprising:

a low-frequency transducer (12) with wide frequency band of the Janus-Helmholtz type, intended for emitting electromagnetic waves towards the sea bed, and a receiver (18) formed of a plurality of hydrophones for capturing the seismic waves reflected by the various layers of the sea bed, characterized in that the transducer (12) is driven by a computer (13) which records the data and programs the signal and the shape of the acoustic waves to be emitted and by a linear power amplifier of class A B or of class D, which delivers a power of between 3 and 9 KVA and in that an impedance matcher (16) is mounted between the transducer and the amplifier so as to allow wide band and high power matching to the transducer, said impedance matcher comprising a compensation inductor serving to correct the impedance of the transducer by lowering its capacitance, a transformer which matches the corrected impedance of the transducer to the output impedance of the power amplifier and a quenching resistor which makes it possible to reduce the excitation power and to smooth the response of the transducer, the transducer thus driven emitting a signal extending over a frequency band lying between a few hundred Hz and 10,000 Hz approximately with an emission level of around 200 dB over a frequency range lying between 600 and 2000 Hz.

2. The seismic acquisition device as claimed in claim 1, characterized in that the transducer (12) is accommodated inside a fairing (56) of hydrodynamic shape and is mounted therein in such a way that the direction of emission of the waves can be oriented in any chosen direction, and in particular vertically.

3. The seismic acquisition device as claimed in claim 1, characterized in that the transducer is of low weight and low bulk and its fairing is furnished with a tail unit (61), this enabling the transducer to be towed in the water with a low resistance at immersion depths lying between 0 and 11,000 m.

* * * * *